(12) United States Patent
Baudart et al.

(10) Patent No.: US 10,216,004 B2
(45) Date of Patent: Feb. 26, 2019

(54) SYSTEM FOR PROVIDING AN OPTHALMIC LENS (71) Applicant: Essilor International, Charenton-le-Pont (FR)

(72) Inventors: Thierry Baudart, Paris (FR); Robert Pellegris, Paris (FR)

(73) Assignee: Essilor International, Charenton-le-Pont (FR)

( * ) Notice: Subject to any disclaimer, the term of this patent is extended or adjusted under 35 U.S.C. 154(b) by 439 days.

(21) Appl. No.: 14/787,839

(22) PCT Filed: Apr. 16, 2014

(86) PCT No.: PCT/EP2014/057782
§ 371 (c)(1),
(2) Date: Oct. 29, 2015

(87) PCT Pub. No.: WO2014/177389
PCT Pub. Date: Nov. 16, 2014

(65) Prior Publication Data
US 2016/0077359 A1    Mar. 17, 2016

(30) Foreign Application Priority Data
Apr. 29, 2013   (EP) ..................................... 13305567

(51) Int. Cl.
*G02C 7/02*         (2006.01)
*G06Q 30/06*       (2012.01)

(52) U.S. Cl.
CPC ............. *G02C 7/027* (2013.01); *G02C 7/028* (2013.01); *G06Q 30/06* (2013.01)

(58) Field of Classification Search
CPC ................................ G02C 7/024; G02C 7/028
(Continued)

(56) References Cited

U.S. PATENT DOCUMENTS 6,390,624 B1 *   5/2002   Hough ................... G02C 7/043
                                                    351/159.74
7,036,931 B2     5/2006   Lindacher et al.
(Continued)

FOREIGN PATENT DOCUMENTS

CN          101116024 A      1/2008
CN          102224514 A     10/2011
(Continued)

OTHER PUBLICATIONS

International Search Report dated Mar. 6, 2014; PCT International Application No. PCT/EP2014/057782.
(Continued)

*Primary Examiner* — Michael J Brown
(74) *Attorney, Agent, or Firm* — Oblon, McClelland, Maier & Neustadt, L.L.P.

(57) ABSTRACT

A system, ophthalmic lens manufacturing equipment, and method for providing an ophthalmic lens. The method includes transmitting an order request of an ophthalmic lens from an ordering side to an ophthalmic lens calculator, the order request including at least prescription data of a wearer of the ophthalmic lens, generating an ophthalmic lens model from the order request, the ophthalmic lens model containing data related to the ophthalmic lens to be provided, the ophthalmic lens model data including geometrical data related to the ophthalmic lens, the geometrical data of the ophthalmic lens model being coded by using mathematical functions to define surfaces of the ophthalmic lens in a continuous way. The method further includes receiving the ophthalmic lens model and the order request at a management entity, and transmitting the ophthalmic lens model from the management entity to an ophthalmic lens manufacturing module.

12 Claims, 4 Drawing Sheets (58) Field of Classification Search
USPC .......................................................... 700/97
See application file for complete search history.

(56) References Cited

U.S. PATENT DOCUMENTS 8,880,211 B2 * 11/2014 Buchet ................. G06Q 10/087
700/117
2004/0246440 A1 12/2004 Andino

FOREIGN PATENT DOCUMENTS

EP         2175405 A1    4/2010
EP         2541490 A1    1/2013
WO         0048035 A1    8/2000

OTHER PUBLICATIONS

Combined Chinese Office Action and Search Report dated Jun. 28, 2018 in Patent Application No. 201480024540.1 (with English translation of Categories of Cited Documents), citing documents AO and AP therein, 13 pages.
European Office Action dated Sep. 21, 2018 in EP Application No. 14 722 127.9-1224, 13 pages.

* cited by examiner

SYSTEM FOR PROVIDING AN OPTHALMIC LENS

The invention relates to system and method for providing an ophthalmic lens.

The discussion of the background of the invention herein is included to explain the context of the invention. This is not to be taken as an admission that any of the material referred to was published, known or part of the common general knowledge at the priority date of any of the claims.

Ophthalmic lenses are commonly used for correcting many different types of vision deficiencies of a wearer of the ophthalmic lens. These include defects such as near-sightedness (myopia) and far-sightedness (hypermetropia), astigmatism, and defects in near-range vision usually associated with aging (presbyopia).

An ophthalmic lens is typically made of plastic material and generally has two opposing surfaces which co-operate with one another to provide a required refractive property, generally corresponding to the wearer's prescription.

Currently, for providing an ophthalmic lens, an eye care practitioner orders the ophthalmic lens at an ophthalmic lab by sending an order request to the ophthalmic lab. The order request comprises wearer data, for example the wearer's prescription, spectacle frame data, for example the type of spectacle frame the wearer has selected, and lens data, for example the type of ophthalmic lens the wearer has selected.

The ophthalmic lab receives the order request and sends it to an ophthalmic lens designer. The lens designer uses the data comprised in the order request to calculate an ophthalmic lens design. The ophthalmic lens design comprises geometrical data of the ophthalmic lens to be provided to the wearer, and manufacturing process data related to manufacturing process of the ophthalmic lens.

The ophthalmic design determined by the lens designer is sent to the ophthalmic lab and the ophthalmic lens is manufactured based on the calculated design. The ophthalmic lens is then sent to the eye care practitioner.

The current ophthalmic lens providing process presents some drawbacks.

Firstly, as each ophthalmic lens designer has its own designs, the ophthalmic labs have to be adapted to the different designs. And, when a lens designer creates a new design, all the actors involved in the providing process, in particular the ophthalmic labs, have to update their interfaces so as to be adapted to the new design. This makes the proposition of a new ophthalmic design complex, time consuming and costly.

In the same way, as each lab has its own apparatus, each lens designer has to be adapted to calculate manufacturing process data for the different ophthalmic labs.

Secondly, the manufacturing process data are calculated prior to the beginning of the manufacturing process, and it is not possible to recalculate some of the manufacturing process data during the manufacturing process, for example to update the manufacturing process data based on measured process data. It is not possible to recalculate some of the manufacturing process data without recalculating also the geometrical data of the ophthalmic lens. This may result in a lack of precision and/or a waste of calculation resource.

Thirdly, each ophthalmic designer has its own data formats, and each ophthalmic lab has its own tools for using the geometrical data and the manufacturing process data. This may result in significant differences between two lenses manufactured by two different labs based on the same prescription and lens definition. This may also result in a high complexity for managing the output data format of the lens designers or the input data format of the manufacturing equipment.

Fourthly, two transmission-reception steps are necessary to start the calculation, between the eye care practitioner orders and the ophthalmic lab, and between the ophthalmic lab and the lens designer. This complicates the providing process.

Fively, currently the link between the manufacturing calculator and the manufacturing equipment is made using a SDF (or HSC) file which includes a grid of points. This grid must be finely modelled in the manufacturing equipment for numerical command in order to manage the engines of each axis of numerical tool. This grid is often re-sampled at the level of the manufacturing equipment. This may result in a lack of precision and/or a waste of calculation resource.

One object of the invention is to provide system and method for providing an ophthalmic lens that do not present the drawbacks mentioned hereinabove.

To this end, the invention proposes a system for providing an ophthalmic lens, comprising:
  an ophthalmic lens calculator comprising:
    receiving means configured to receive an order request of the ophthalmic lens from an ordering side, the order request comprising at least prescription data of the wearer for the ophthalmic lens, and
    generation means configured to generate, in response to the reception of the order request, an ophthalmic lens model, the ophthalmic lens model containing data related to the ophthalmic lens to be provided, the ophthalmic lens model data comprising geometrical data related to the ophthalmic lens,
  a management entity comprising:
    receiving means configured to receive the order request of the ophthalmic lens, and the ophthalmic lens model in a predetermined format,
    transmitting means configured to transmit to an ophthalmic lens manufacturing module the ophthalmic lens model,
  an ophthalmic lens manufacturing module comprising:
    receiving means configured to receive the ophthalmic lens model,
    processing means configured to use a functions library containing functions to calculate ophthalmic lens manufacturing process data from the ophthalmic lens model data.

The ophthalmic lens calculator may further comprise short optimization means configured to perform a quick generation of a rough ophthalmic lens model prior to the generation of the ophthalmic lens model.

The system may further comprise a convertor configured to:
  receive an ophthalmic lens model from the ophthalmic lens calculator,
  convert the received ophthalmic lens model in the predetermined format.

The geometrical data of the ophthalmic lens model may be coded by using mathematical functions, to define surfaces of the ophthalmic lens in a continuous way.

The ophthalmic lens model may be coded by using a markup language.

The geometrical data may comprise data related to a front surface of the ophthalmic lens, data related to a back surface of the ophthalmic lens, data related to a relative position of the front and back surfaces, and data related to a shape of the ophthalmic lens.

The ophthalmic lens model may further comprise manufacturing process data related to a step of manufacturing said ophthalmic lens, the manufacturing process data comprising at least one of the following data among: data related to a marking of the ophthalmic lens, data related to a material of the ophthalmic lens, data related to a treatment of a surface of the ophthalmic lens, data related to a coloration of the ophthalmic lens, data related to a surface generation of a face the ophthalmic lens, data related to a polishing of a face the ophthalmic lens, data related to an edging of the ophthalmic lens, data related to a mounting of the ophthalmic lens in a spectacle frame, data related to a control of the ophthalmic lens.

The system may further comprise an ophthalmic lens manufacturing equipment, wherein said ophthalmic lens manufacturing equipment comprises:
  receiving means configured to receive the ophthalmic lens model from the ophthalmic lens manufacturing module, and
  manufacturing means configured to carry out the step of manufacturing said ophthalmic lens from said manufacturing process data.

The functions library may comprise at least a function to process a parameter of a surface of the ophthalmic lens.

The functions library may comprise at least a function to process a parameter in relation with the two surfaces of the ophthalmic lens.

The invention further proposes a management entity for processing an order request of an ophthalmic lens, comprising:
  receiving means configured to receive:
    an order request of an ophthalmic lens, the order request comprising at least prescription data of the wearer of the ophthalmic lens, and
    an ophthalmic lens model in a predetermined format, the ophthalmic lens model containing data related to the ophthalmic lens to be provided, the ophthalmic lens model data comprising geometrical data related to the ophthalmic lens,
  transmitting means configured to transmit to an ophthalmic lens manufacturing module the ophthalmic lens model.

The invention further proposes an ophthalmic lens manufacturing module configured to calculate manufacturing process data for providing an ophthalmic lens, comprising:
  receiving means configured to receive an ophthalmic lens model containing data related to the ophthalmic lens to be provided, the ophthalmic lens model data comprising geometrical data related to the ophthalmic lens,
  processing means configured to use a functions library containing functions to calculate ophthalmic lens manufacturing process data from the ophthalmic lens model data.

The invention further proposes an ophthalmic lens manufacturing equipment configured to carrying out a step of manufacturing an ophthalmic lens, comprising:
  receiving means configured to receive an ophthalmic lens model from an ophthalmic lens manufacturing module, the ophthalmic lens model containing data related to the ophthalmic lens to be provided, the ophthalmic lens model data comprising geometrical data related to the ophthalmic lens, the ophthalmic lens model further comprising manufacturing process data related to a step of manufacturing said ophthalmic lens, and
  manufacturing means configured to carry out the step of manufacturing said ophthalmic lens from said manufacturing process data.

The invention further proposes a method for providing an ophthalmic lens, comprising:
  a first transmission step during which an order request of an ophthalmic lens is transmitted from an ordering side to an ophthalmic lens calculator, the order request comprising at least prescription data of the wearer of the ophthalmic lens,
  an ophthalmic lens model generation step during which an ophthalmic lens model is generated from the order request, the ophthalmic lens model containing data related to the ophthalmic lens to be provided, the ophthalmic lens model data comprising geometrical data related to the ophthalmic lens,
  a reception step during which the ophthalmic lens model and the order request are received at a management entity,
  a second transmission step during which the ophthalmic lens model is transmitted from the management entity to an ophthalmic lens manufacturing module.

The method may further comprise:
  a processing step during which a functions library containing functions is used at the ophthalmic lens manufacturing module to calculate manufacturing process data from the ophthalmic lens model data, and
  a gathering step wherein said manufacturing process data are gathered to said ophthalmic lens model.

The method may further comprise a third transmission step during which the ophthalmic lens model comprising manufacturing process data is transmitted from the ophthalmic lens manufacturing module to an ophthalmic lens manufacturing equipment.

The invention further proposes a computer program product comprising one or more stored sequences of instructions that are accessible to a processor and which, when executed by the processor, causes the processor to carry out the steps of the method.

The invention further proposes a computer readable medium carrying one or more sequences of instructions of the computer program product.

Unless specifically stated otherwise, as apparent from the following discussions, it is appreciated that throughout the specification discussions utilizing terms such as "computing", "calculating", "generating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

Non limiting embodiments of the invention will now be described with reference to the accompanying drawing wherein.

Elements in the Figures are illustrated for simplicity and clarity and have not necessarily been drawn to scale. For example, the dimensions of some of the elements in the figures may be exaggerated relative to other elements to help improve the understanding of the embodiments of the present invention.

Figure 1:
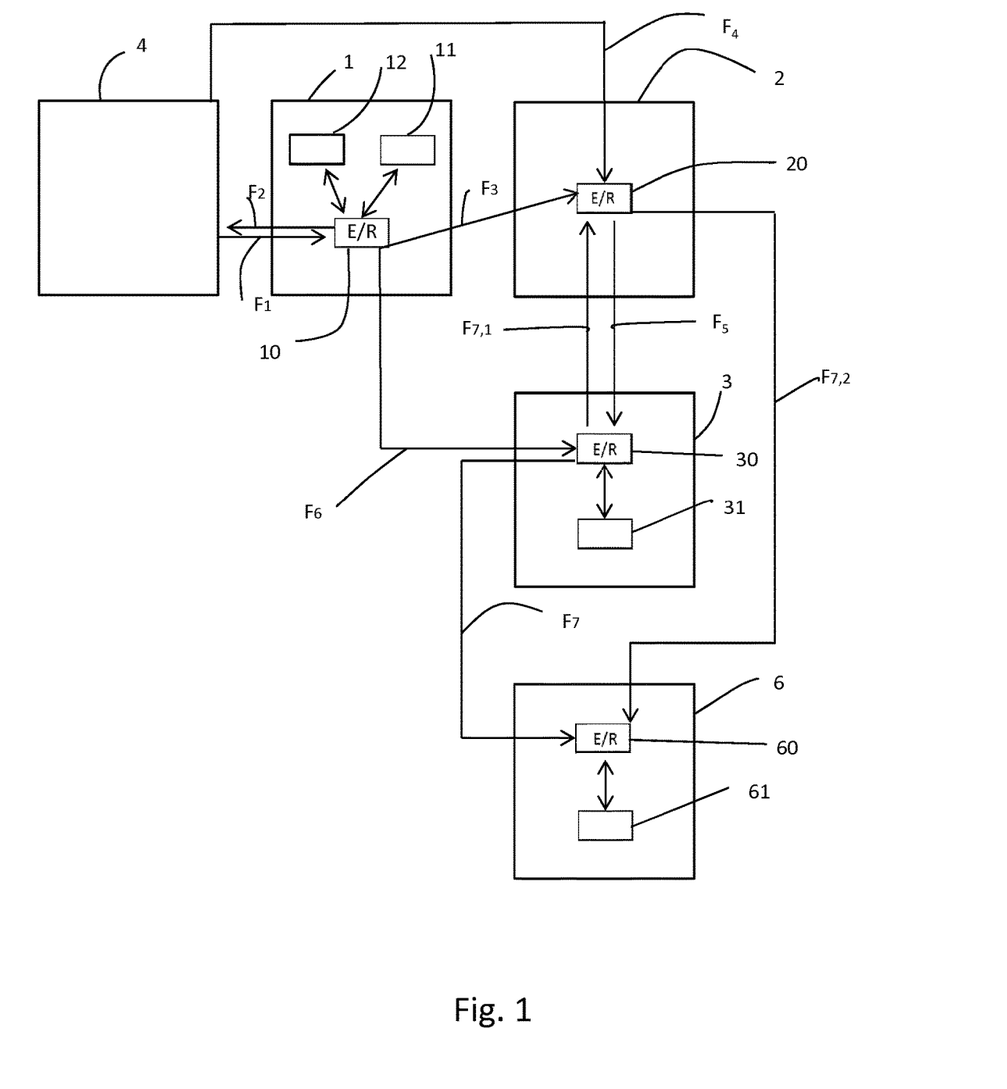
FIG. 1 is a schematic view of a system for providing an ophthalmic lens according to an embodiment of the invention.

FIG. 1 shows a system for providing an ophthalmic lens according to an embodiment of the invention.

In the context of the present invention, the term "ophthalmic lens" can refer to a lens blank, an uncut lens, or a semi-finished lens. It will be understood that the providing process of the ophthalmic lens can refer to any stage(s) of the calculation process and/or the manufacturing process of the ophthalmic lens.

The system comprises an ophthalmic lens calculator 1, a management entity 2, and an ophthalmic lens manufacturing module 3.

The ophthalmic lens calculator 1 comprises transmitting-receiving means 10 configured to receive an order request of the ophthalmic lens from an ordering side 4, as symbolized by the arrow F.

The ordering side 4 may refer to a device of an eye care practitioner.

The order request comprises at least prescription data of the wearer of the ophthalmic lens. The prescription data comprise a set of optical characteristics such as spherical power, cylindrical power, cylinder axis, addition power, and prescribed prism, determined by an ophthalmologist in order to correct the vision defects of the wearer.

The ophthalmic lens calculator 1 further comprises generation means 11 configured to generate, in response to the reception of the order request, an ophthalmic lens model containing data related to the ophthalmic lens to be provided.

The ophthalmic lens model may be coded by using a markup language, for instance the Extensible Markup Language (XML).

The ophthalmic lens model data comprise geometrical data related to the ophthalmic lens. The geometrical data may comprise data related to a front surface of the ophthalmic lens, data related to a back surface of the ophthalmic lens, data related to a relative position of the front and back surfaces, and/or data related to a shape of the ophthalmic lens.

The geometrical data may be coded by using mathematical functions, to define surfaces of the ophthalmic lens in a continuous way. The mathematical functions are for instance Non-uniform Rational Basis Spline (NURBS) functions. The NURBS functions may be defined using the COLLAborative Design Activity (COLLADA) standard format.

Advantageously, by using NURBS as an input format for the manufacturing module 3 and for the manufacturing equipments we avoid extra sampling of the geometrical data at these levels that are necessary when the input formats include grid of points.

The ophthalmic lens model may further comprise manufacturing process data related to one or several step(s) of manufacturing the ophthalmic lens. The manufacturing process data may comprise at least one of the following data among: data related to a marking of the ophthalmic lens, data related to a material of the ophthalmic lens, data related to a treatment of a surface of the ophthalmic lens, data related to a coloration of the ophthalmic lens, data related to a surface generation of a face the ophthalmic lens, data related to a polishing of a face the ophthalmic lens, data related to an edging of the ophthalmic lens, data related to a mounting of the ophthalmic lens in a spectacle frame, data related to a control of the ophthalmic lens.

The ophthalmic lens calculator 1 may further comprise short optimization means 12 configured to perform a quick generation of a rough ophthalmic lens model prior to the generation of the ophthalmic lens model. The rough ophthalmic lens model may be calculated faster than the ophthalmic lens model, and may be transmitted to the ordering side 4, as symbolized by the arrow $F_2$.

The management entity 2 comprises transmitting-receiving means 20 configured to receive the order request of the ophthalmic lens, and the ophthalmic lens model in a predetermined format. The order request and the ophthalmic lens model may be received simultaneously from the calculator 1, as symbolized by the arrow $F_3$. According to another embodiment of the invention, only the ophthalmic lens model is received from the calculator 1. In this embodiment, the order request is received from the ordering side 4, as symbolized by the arrow $F_4$.

The transmitting-receiving means 20 are further configured to transmit the ophthalmic lens model to the ophthalmic lens manufacturing module 3.

The ophthalmic lens manufacturing module 3 comprises transmitting-receiving means 30 configured to receive the ophthalmic lens model. The ophthalmic lens model may be received from the management entity 2, as symbolized by the arrow $F_5$, or directly from the calculator 1, as symbolized by the arrow $F_6$.

The ophthalmic lens manufacturing module 3 further comprises processing means 31 configured to use a functions library containing functions to calculate ophthalmic lens manufacturing process data from the ophthalmic lens model data.

The functions library may comprise one or several function(s) to process one or several parameter(s) of a surface of the ophthalmic lens. Such functions may include functions to calculate an altitude, a derivative, a normal, and/or a curvature of a point of a surface of the ophthalmic lens.

The functions library may further comprise one or several function(s) to process one or several parameter(s) in relation with the two surfaces of the ophthalmic lens. Such functions may include a function to calculate a thickness of the ophthalmic lens at a predetermined point of the ophthalmic lens and according to a predetermined direction, and/or a function to calculate an optical power of the ophthalmic lens at a predetermined point of the ophthalmic lens.

The functions library may further comprise one or several function(s) to recalculate a surface (for instance a back surface) of the ophthalmic lens based on a shift measured during the manufacturing process, for example a blocking shift. Such functions aim at improving the precision of the providing process by taking into account actual manufacturing process data measured during the manufacturing process.

The continuous definition of the surfaces of the ophthalmic lens makes the recalculation easier. Indeed, in the known systems, the surfaces of the ophthalmic lens are defined in a discrete way, by using a grid of points. This discrete definition leads to the necessity of an interpolation step before the recalculation step.

Figure 2:
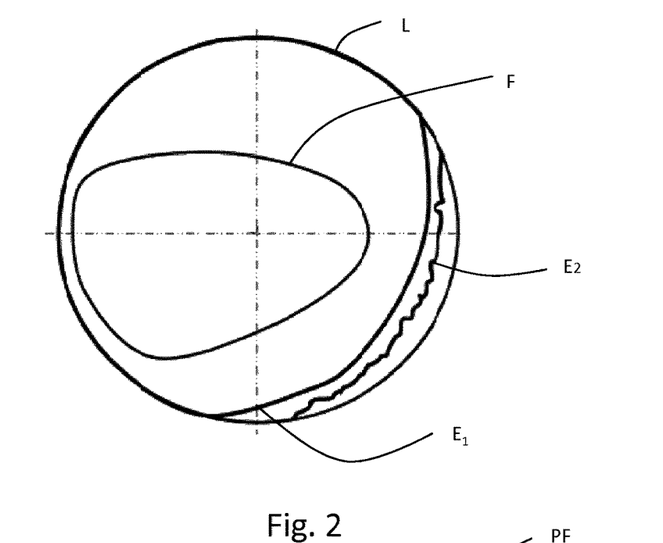
FIG. 2 is a schematic view showing an uncut ophthalmic lens and an edge for edging the ophthalmic lens.

The functions library may further comprise one or several function(s) to perform a digital cribbing, that is to say to determine, from an uncut ophthalmic lens L (FIG. 2), an edge $E_1$ for edging the lens L in order to assure that, after the surfacing of the lens L, the edge of the lens L will have a minimum thickness, and a minimal distance to the edge of the frame F in which the lens L is to be mounted. For comparison, the FIG. 2 represents an edge $E_2$ determined without digital cribbing.

Figure 3:
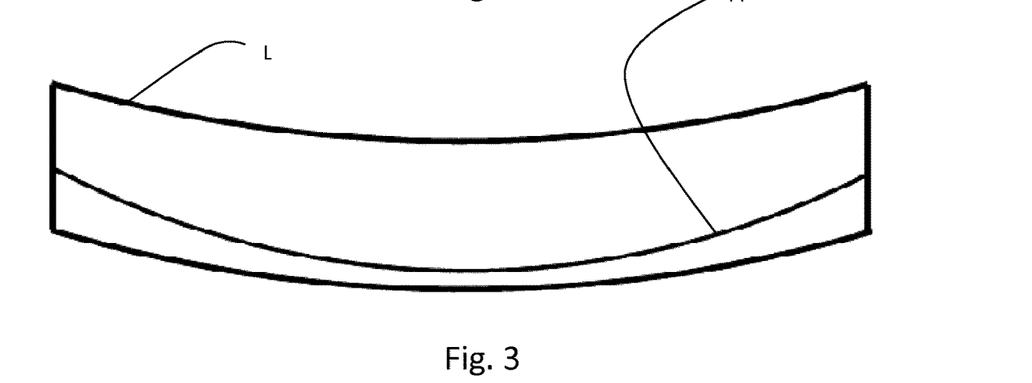
FIG. 3 represents an ophthalmic lens comprising a polarizing filter, prior to the manufacturing process.
Figure 4:
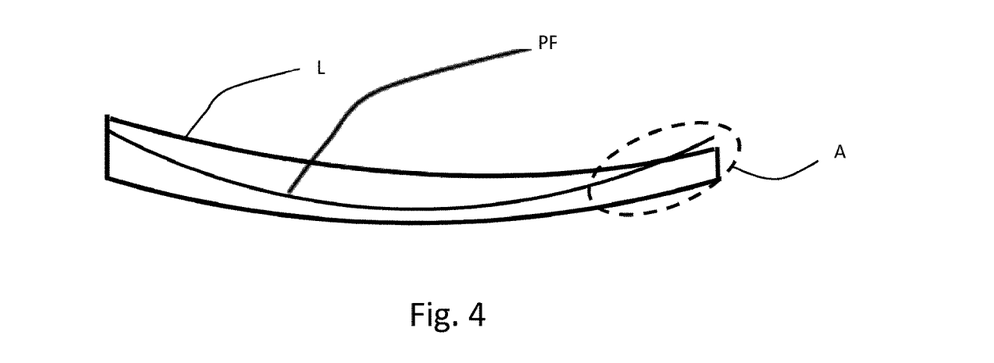
FIG. 4 represents the ophthalmic lens of FIG. 3, after the manufacturing process.

The functions library may further comprise one or several function(s) to determine whether a polarizing filter PF (FIGS. 3 and 4) inserted in the ophthalmic lens L prior to the manufacturing process will cover all a surface of the ophthalmic lens L after the manufacturing process. In the example represented, the function determines that, after the manufacturing process, the polarizing filter PF would not cover the area A of the lens.

The ophthalmic lens manufacturing process data calculated by the lens manufacturing module 3 may be gathered to the ophthalmic lens model. Thus, only the ophthalmic lens model needs to be transmitted to an ophthalmic lens manufacturing equipment 6.

The ophthalmic lens manufacturing equipment 6 comprises transmitting-receiving means 60 configured to receive the ophthalmic lens model from the ophthalmic lens manufacturing module 3. The ophthalmic lens model may be received directly from the lens manufacturing module 3, as symbolized by the arrow $F_7$. According to another embodiment of the invention, the ophthalmic lens model is received from the lens manufacturing module 3 via the management entity 2, as symbolized by the arrows $F_{7,1}$ and $F_{7,2}$.

The ophthalmic lens manufacturing equipment 6 further comprises manufacturing means 61 configured to carry out the step of manufacturing the ophthalmic lens from the manufacturing process data.

Figure 5:
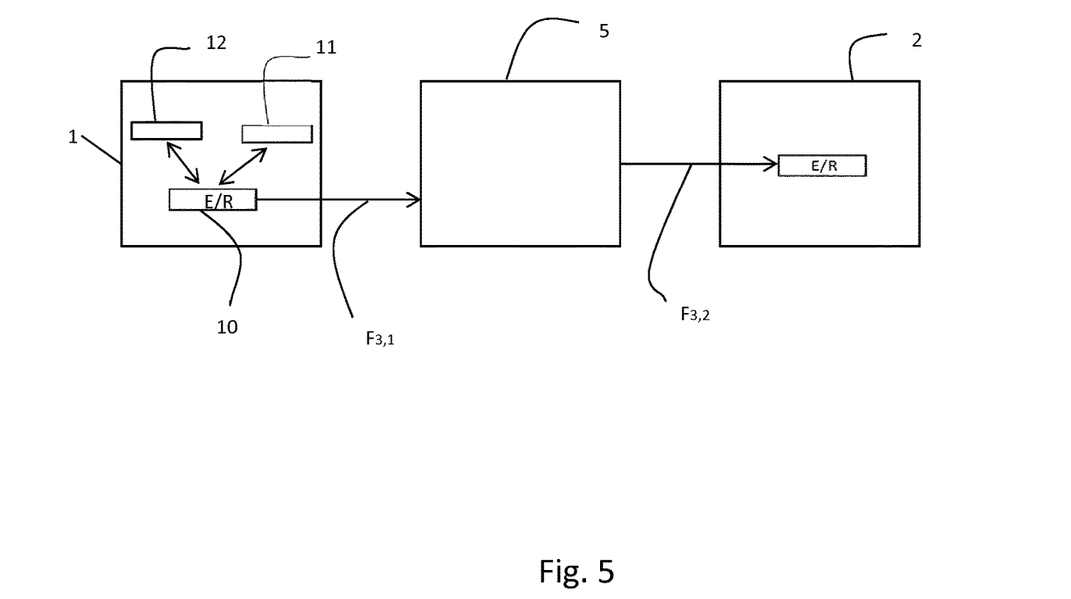
FIG. 5 represents an embodiment of the invention in which the system further comprises a convertor.

According to an embodiment of the invention represented in FIG. 5, the system may further comprise a convertor 5 configured to receive an ophthalmic lens model from the ophthalmic lens calculator 1, as symbolized by the arrow $F_{3,1}$, and to convert the received ophthalmic lens model in the predetermined format. The convertor 5 may be arranged between the calculator 1 and the management entity 2, and be configured to transmit the ophthalmic lens model in the predetermined format to the management entity 2, as symbolized by the arrow $F_{3,2}$. Alternatively, the convertor 5 may be embedded in the management entity 2. The convertor 5 aims at providing to the system the capability to generate and use an ophthalmic lens model in a predetermined format regardless of the configuration of the calculator 1.

In the lens providing system disclosed above, all the devices share a common definition of an ophthalmic lens to be provided, the ophthalmic lens model, and a common way to use it, the functions library.

Consequently, the ophthalmic lens model data do not need to be recalculated at the manufacturing side.

Moreover, the difference between two lenses manufactured by two different labs based on the same prescription and lens definition is reduced, so the coherence of the provided lenses is improved.

Besides, the integration of a new design or a new device (calculator, module, equipment) is made easier.

Moreover, the use of the ophthalmic lens model makes easier the communication process between the devices of the system, and it is then possible to reduce the transmission-reception steps.

Figure 6:
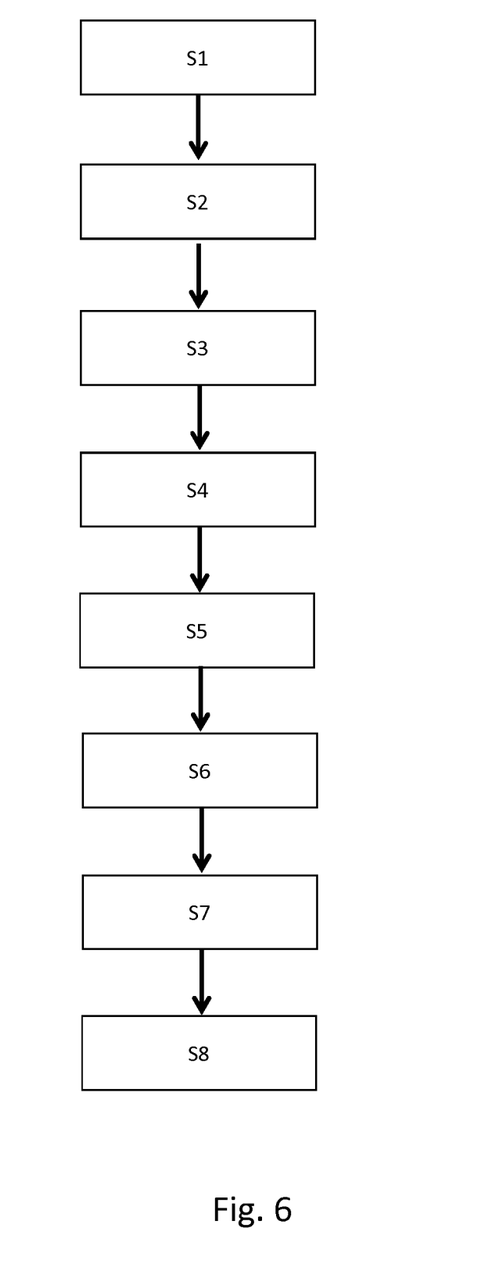
FIG. 6 is a flow chart showing steps of a method of data processing for providing an optical lens according to embodiments of the invention.

Referring to FIG. 6, we are describing below a method for providing an ophthalmic lens according to an embodiment of the invention. The method comprises:
a first transmission step S1,
an ophthalmic lens model generation step S2,
a reception step S3,
a second transmission step S4,
a processing step S5,
a gathering step S6,
a third transmission step S7, and
a manufacturing step S8.

During the first transmission step S1, an order request of an ophthalmic lens is transmitted from the ordering side 4 to the ophthalmic lens calculator 1. As described above, the order request comprises at least prescription data of the wearer of the ophthalmic lens.

During the ophthalmic lens model generation step S2, an ophthalmic lens model is generated from the order request. The ophthalmic lens model contains data related to the ophthalmic lens to be provided. The ophthalmic lens model data comprises geometrical data related to the ophthalmic lens.

During the reception step S3, the ophthalmic lens model and the order request are received at the management entity 2.

During the second transmission step S4, the ophthalmic lens model is transmitted from the management entity 2 to the ophthalmic lens manufacturing module 3.

During the processing step S5, a functions library containing functions is used at the ophthalmic lens manufacturing module 3 to calculate manufacturing process data from the ophthalmic lens model data.

During the gathering step S6, the manufacturing process data are gathered to the ophthalmic lens model.

During the third transmission step S7, the ophthalmic lens model comprising manufacturing process data is transmitted from the ophthalmic lens manufacturing module 3 to the ophthalmic lens manufacturing equipment 6.

During the manufacturing step S8, the ophthalmic lens is manufactured from the manufacturing process data.

The invention claimed is:
1. A system comprising:
a memory; and
at least one processor, wherein the memory is configured to store sequences of instructions that are accessible to the at least one processor and which, when executed by the at least one processor, cause the at least one processor to perform an ophthalmic lens calculation process, the ophthalmic lens calculation process comprising:
receiving an order request of an ophthalmic lens from an ordering side, the order request comprising at least prescription data of a wearer for the ophthalmic lens;
generating, in response to the reception of the order request, an ophthalmic lens model, the ophthalmic lens model containing data related to the ophthalmic lens to be provided, the ophthalmic lens model data comprising geometrical data related to the ophthalmic lens, the geometrical data of the ophthalmic lens model being coded by using mathematical functions to define surfaces of the ophthalmic lens in a continuous way; and
calculating ophthalmic lens manufacturing process data from the ophthalmic lens model data using a functions library containing functions to calculate ophthalmic lens manufacturing process data from the ophthalmic lens model data.

2. The system according to claim 1, wherein the ophthalmic lens calculation process further comprises performing a quick generation of a rough ophthalmic lens model prior to the generation of the ophthalmic lens model.

3. The system according to claim 1, wherein the ophthalmic lens calculation process further comprises:
converting the received ophthalmic lens model in to a predetermined format.

4. The system according to claim 1, wherein the geometrical data comprise data related to a front surface of the ophthalmic lens, data related to a back surface of the ophthalmic lens, data related to a relative position of the front and back surfaces, and data related to a shape of the ophthalmic lens.

5. The system according to claim 1, wherein the ophthalmic lens model further comprises manufacturing process data related to manufacturing said ophthalmic lens, the manufacturing process data comprising at least one of the following data among: data related to a marking of the ophthalmic lens, data related to a material of the ophthalmic lens, data related to a treatment of a surface of the ophthalmic lens, data related to a coloration of the ophthalmic lens, data related to a surface generation of a face the ophthalmic lens, data related to a polishing of a face the ophthalmic lens, data related to an edging of the ophthalmic lens, data related to a mounting of the ophthalmic lens in a spectacle frame, data related to a control of the ophthalmic lens.

6. The system according to claim 5, wherein the ophthalmic lens calculation process further comprises:
manufacturing said ophthalmic lens from said manufacturing process data.

7. The system according to claim 1, wherein the functions library comprises at least a function to process a parameter of a surface of the ophthalmic lens.

8. The system according to claim 1, wherein the functions library comprises at least a function to process a parameter in relation with the two surfaces of the ophthalmic lens.

9. An ophthalmic lens manufacturing equipment configured to manufacture an ophthalmic lens, comprising:
processing circuitry configured to
receive an ophthalmic lens model from an ophthalmic lens manufacturing module, the ophthalmic lens model containing data related to the ophthalmic lens to be provided, the ophthalmic lens model data comprising geometrical data related to the ophthalmic lens, the ophthalmic lens model further comprising manufacturing process data related to manufacturing said ophthalmic lens, the geometrical data of the ophthalmic lens model being coded by using mathematical functions to define surfaces of the ophthalmic lens in a continuous way, and
manufacture said ophthalmic lens from said manufacturing process data.

10. A method for providing an ophthalmic lens, comprising:
transmitting an order request of an ophthalmic lens from an ordering side to an ophthalmic lens calculator, the order request comprising at least prescription data of a wearer of the ophthalmic lens;
generating an ophthalmic lens model from the order request, the ophthalmic lens model containing data related to the ophthalmic lens to be provided, the ophthalmic lens model data comprising geometrical data related to the ophthalmic lens, the geometrical data of the ophthalmic lens model being coded by using mathematical functions to define surfaces of the ophthalmic lens in a continuous way;
receiving the ophthalmic lens model and the order request at a management entity; and
transmitting the ophthalmic lens model from the management entity to an ophthalmic lens manufacturing module.

11. The method according to claim 10, further comprising:
calculating, using a functions library containing functions at the ophthalmic lens manufacturing module, to calculate manufacturing process data from the ophthalmic lens model data; and
gathering said manufacturing process data to said ophthalmic lens model.

12. The method of claim 11, further comprising:
transmitting the ophthalmic lens model comprising manufacturing process data from the ophthalmic lens manufacturing module to an ophthalmic lens manufacturing equipment.

* * * * *